May 1, 1928. 1,668,223

C. UTMAN

LOCKING ATTACHMENT FOR VALVES

Filed May 13, 1927

INVENTOR
*Commodore Utman*
BY
*H. E. Manning*
ATTORNEY

Patented May 1, 1928.

1,668,223

UNITED STATES PATENT OFFICE.

COMMODORE UTMAN, OF THOMASTON, CONNECTICUT.

LOCKING ATTACHMENT FOR VALVES.

Application filed May 13, 1927. Serial No. 191,061.

This invention relates to safety appliances for valves, and more particularly to a device for preventing a valve of a gas stove from accidentally being opened.

One object of this invention is to provide a safety locking device of the above nature which will automatically lock the valve merely by the operation of turning off the gas valve cock.

A further object is to provide a device of the above nature which may be readily attached to and detached from the valve casing of an ordinary gas stove which is already in use.

A further object is to provide a device of this nature which will be simple in construction, inexpensive to manufacture, easy to install and manipulate, compact, ornamental in appearance, and very efficient and durable in use.

With these and other objects in view there has been illustrated on the accompanying drawings one form in which the invention may be conveniently embodied in practice.

Figure 1:
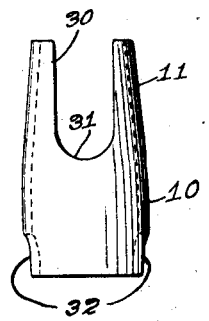
Fig. 1 represents an end view in elevation of the locking attachment.
Figure 2:
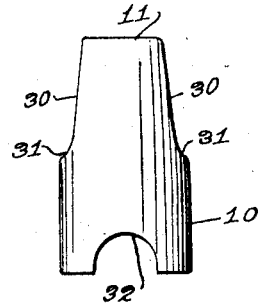
Fig. 2 is a side view of the same.
Figure 3:
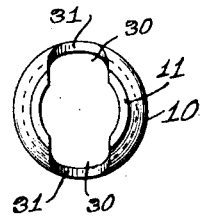
Fig. 3 is a top plan view of the same.

Referring now to the drawings in which like reference numerals denote corresponding parts throughout the several views, the locking attachment herein disclosed comprises a short hollow tubular sleeve having a lower cylindrical section 10 and an upper frusto-conical tapered section 11. The locking attachment is adapted to fit loosely around a vertical valve plug 12 having an enlarged upper socket 13 for receiving a horizontal tapered handle 14. The handle 14 is adapted to be held in place by a screw rod threaded into the socket 13, said screw rod having a slotted head 15 located outside the larger end 17 of the handle 14, as clearly shown in Figs. 4 and 5. The vertical valve plug 12 has a threaded socket in its bottom end for receiving a bolt 18, the upper end of which is threaded and screwed into said plug socket. The bolt 18 has an enlarged bottom slotted head 19 for engaging the lower end of a helical spring 19ª, the upper end of said spring engaging a washer 20 which is adapted to contact with the base of the plug 12 and the enlarged, slightly tapered, bottom leg 21 of a valve body 22.

The valve body 22 is formed substantially in the shape of a cross and besides the enlarged bottom leg 21 has a similar enlarged, slightly tapered, top leg 23, and a pair of horizontal threaded inner and outer cylindrical pipe ends 24 and 25. The threaded end 24 is adapted to be connected to a gas supply pipe 26, while the threaded end 25 is adapted to receive a screw cap gas regulator needle-valve member 27 for closing it.

In order to limit the rotation of the valve plug 12 to ninety degrees, the top leg 23 of the valve casing 22 is provided with a flat slot 28 in its upper edge in which slides a pin 29 projecting from one side of the plug 12.

For the purpose of locking the tubular sleeve in non-rotative relation to the handle 14, the upper conical section 11 of said sleeve is provided with a pair of elongated recesses 30, said recesses having their sides parallel throughout substantially their lengths and terminating at their bottoms in semi-circular arcs 31, as clearly shown in Fig. 1. The recesses 30 are loosely and slidably fitted over the sides of the handle 14, and whenever the handle 14 is rotated for opening or closing the valve, the locking sleeve attachment will turn with it.

In order to cause the locking sleeve to non-rotatively engage with the pipe sections 24 and 25 when the gas valve cock has been turned to closed position, the lower cylindrical section 10 of the locking sleeve is provided with a pair of semi-circular recesses 32 shaped to fit over the sections 24 and 25.

Figure 4:
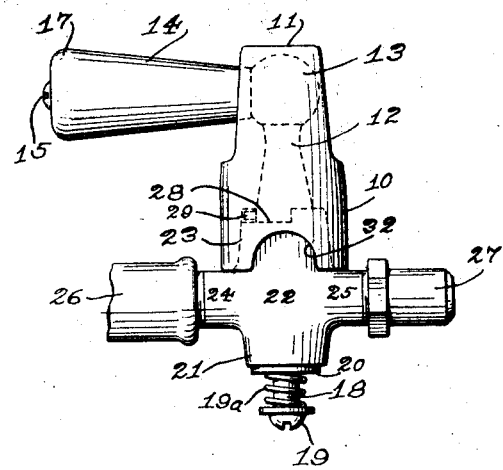
Fig. 4 is a side view of a gas valve cock with the locking attachment in operating position—the valve being shown in the "on" position.
Figure 5:
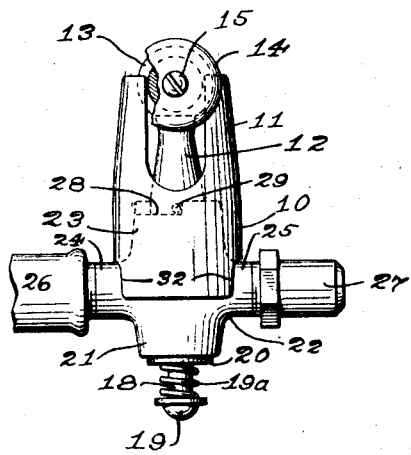
Fig. 5 is a view similar to Fig. 4, but with the valve in the "off" position.

In operation, when it is desired to place the locking sleeve attachment in position upon the gas valve, it will only be necessary to first remove the handle 14 from its socket 13 in the plug 12. The locking sleeve may then be slipped down over the plug 12 into the position shown in Fig. 5, whereupon the handle will be again screwed into the socket 13. When it is desired to turn on the gas, it will only be necessary for the operator, using the fingers of one hand, to lift the locking sleeve attachment upwardly until the recesses 32 are disengaged from the pipe sections 24 and 25. The valve handle 14 may then be turned from the closed position shown in Fig. 5 to the open position shown in Fig. 4, where the sleeve attachment will remain in unlocked position as long as the gas valve is open. Assuming the gas valve to be in open position, as shown in Fig. 4, when it is desired to close the valve, the operator will move the handle from the position shown in Fig. 4 to the position shown in Fig. 5. During this operation the sleeve attachment will drop by gravity into interlocking engagement with the pipe sections 24 and 25. In this position the locking sleeve will prevent the valve from accidentally being opened.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a locking attachment for a handle-operated valve cock, a tubular member for engaging said handle and having slots in its lower end for non-rotatively engaging the casing of said valve when the handle is located in the "off" position, whereby said handle cannot be accidentally turned to "on" position, said tubular member being open at both ends and non-rotatively connected with said handle at all times.

2. In a locking attachment for a handle-operated valve cock having a stem fitting within a valve casing, a tubular member for loosely and slidably surrounding the stem of said valve, said tubular member having a slot in its upper edge to fit about said handle and hold said tubular member against rotation relative to said handle at all positions of said handle, said tubular member also having a slot through its lower edge to fit over said valve casing and lock said tubular member against rotation relative to said casing when the valve cock is in closed position, said valve cock being capable of rotation to open position by operation of said handle only after said tubular member has been raised out of interlocking engagement with said casing.

3. In a locking attachment for a handle-operated valve cock having a stem fitting within a valve casing, a tubular member for loosely and slidably surrounding the stem of said valve, said tubular member having a pair of opposed slots in its upper edge to fit about said handle and hold said sleeve against rotation relative to said handle at all positions of said handle, said tubular member also having a slot through its lower edge to fit over said valve casing and lock said sleeve against rotation relative to said casing when the valve cock is in closed position, said valve cock being capable of rotation to open position by operation of said handle only after said sleeve has been raised out of interlocking engagement with said casing.

4. In a locking attachment for a handle-operated valve cock having a stem fitting within a valve casing, a tubular member for loosely and slidably surrounding the stem of said valve, said tubular member having a slot in its upper edge to fit about said handle and hold said sleeve against rotation relative to said handle at all positions of said handle, said tubular member also having a pair of slots in its lower edge to fit over said valve casing and lock said sleeve against rotation relative to said casing when the valve cock is in closed position, said valve cock being capable of rotation to open position by operation of said handle only after said sleeve has been raised out of interlocking engagement with said casing.

5. In a locking attachment for a handle-operated valve cock having a stem fitting within a valve casing, a tubular member for loosely and slidably surrounding the stem of said valve, said tubular member having a pair of opposed slots in its upper edge to fit about said handle and hold said sleeve against rotation relative to said handle at all times, said tubular member also having a pair of slots in its lower edge to fit over said valve casing and lock said sleeve against rotation relative to said casing when the valve cock is in closed position, said valve cock being capable of rotation to open position by operation of said handle only after said sleeve has been raised out of interlocking engagement with said casing.

6. In a locking attachment for a handle-operated valve cock having a stem fitting within a valve casing, a tubular member for loosely and slidably surrounding the stem of said valve, said tubular member having a pair of opposed slots in its upper edge to fit about said handle and hold said sleeve against rotation relative to said handle at all times, said tubular member also having a pair of slots in its lower edge to fit over said valve casing and lock said sleeve against rotation relative to said casing when the valve cock is in closed position, said valve cock being capable of rotation to open position by operation of said handle only after said sleeve has been raised out of interlocking engagement with said casing, the angular position of the slots in the upper edge of said sleeve being at right-angles to the angular position of the slots in said lower edge.

7. In a valve, a casing, an upwardly projecting valve stem in said casing, a laterally extending handle secured to said valve stem, a tubular member having an upper vertical slot non-rotatively engaging said handle at all times, said tubular member having a pair of lower slots extending upwardly into its lower edge for non-rotatively engaging said casing when the handle is in the "off" position, said handle serving to hold said tubular member from removal.

8. In a gas range valve, a casing, an upwardly extending valve cock in said casing, a handle on said valve cock, a tubular member surrounding said valve cock and non-rotatively engaging said handle at all times, said tubular member having open slots in its lower end for interlocking with said casing when the handle is in the "off" position for holding said valve closed until said tubular member has been raised out of locking engagement with said casing, said handle serving to hold said tubular member from removal.

9. In a gas range valve, a T-shaped casing having side arms, an upwardly extending valve cock in said casing, a handle on said valve cock, a tubular member surrounding said valve cock and non-rotatively engaging said handle at all times, said tubular member having open slots in its lower end for interlocking with the side arms of said casing when the handle is in the "off" position for holding said valve in closed position until said tubular member has been raised out of locking engagement with said casing, said handle serving to hold said tubular member from removal.

10. In a valve, a casing, an upwardly projecting valve stem in said casing, a laterally extending handle secured to said valve stem, a tubular member rotatable relative to said casing and having an upper vertical slot non-rotatively engaging said handle, said tubular member having a pair of lower slots extending upwardly into its lower edge for non-rotatively engaging said casing when the handle is in the "off" position, and means for guiding said tubular member in its rotation to prevent it from tipping.

In testimony whereof, I have affixed my signature to this specification.

COMMODORE UTMAN.